United States Patent [19]
Rath et al.

[11] 3,708,043
[45] Jan. 2, 1973

[54] DISC BRAKES

[75] Inventors: Heinrich Bernhard Rath, Koblenz-Luetzel; Wolfgang Hess, Rubenach, both of Germany

[73] Assignee: Girling Limited, Birmingham, England

[22] Filed: Sept. 22, 1970

[21] Appl. No.: 74,328

[30] Foreign Application Priority Data

Sept. 25, 1969 Great Britain.....................47,135/69

[52] U.S. Cl..............................188/73.3, 188/73.1
[51] Int. Cl..........................................F16d 55/228
[58] Field of Search.......188/73.1, 250 B, 72.4, 72.5, 188/73.3, 73.6

[56] References Cited

UNITED STATES PATENTS 3,162,272   12/1964   Gancel ..............................188/73.3

Primary Examiner—George E. A. Halvosa
Attorney—Scrivener, Parker, Scrivener and Clarke

[57] ABSTRACT

A spot-type disc brake has a fixed caliper straddling the disc and containing hydraulic actuator pistons acting on the back plates of opposed brake pads disposed at opposite sides of the disc. The back plates have "T" shaped side edge portions whose circumferentially inwardly facing surfaces cooperate with circumferentially outwardly facing abutment surfaces on the caliper. This enables the brake drag forces to be taken from the brake pads at their leading edges.

10 Claims, 6 Drawing Figures

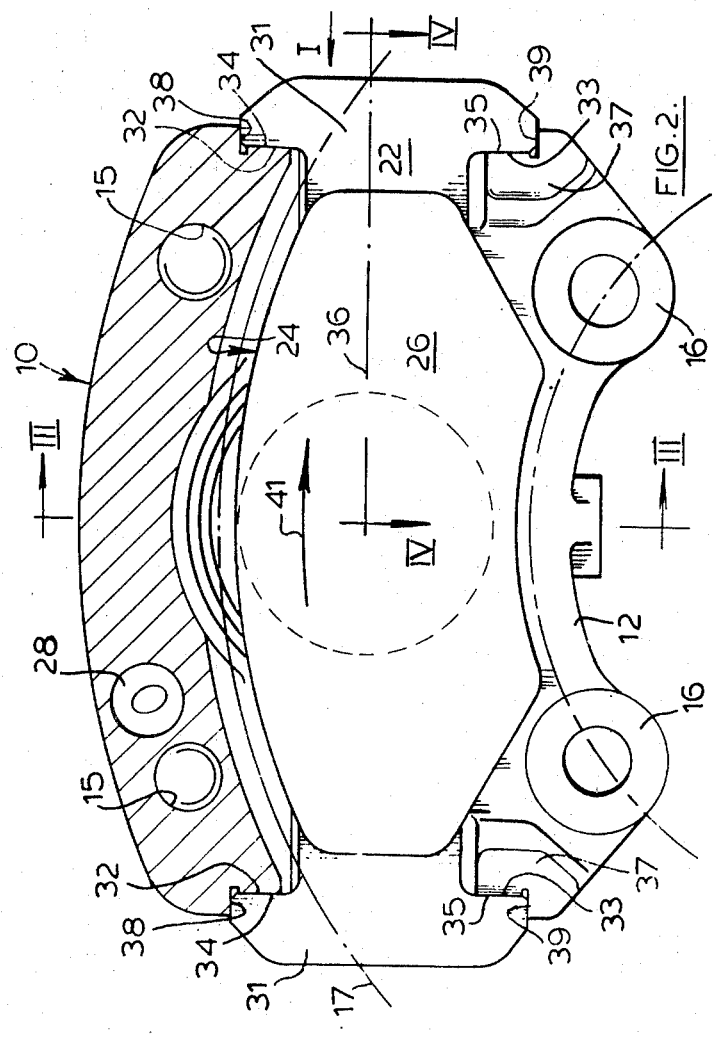

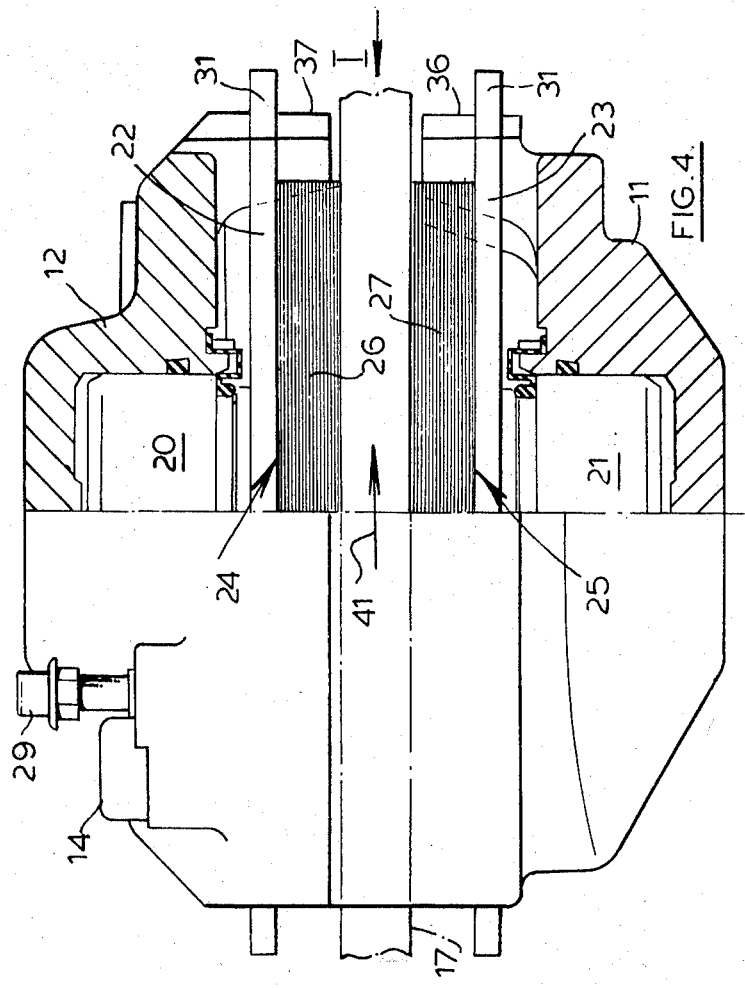

DISC BRAKES

The present invention relates to spot-type disc brakes having a caliper adapted to straddle the disc and a pair of opposed brake pads located in the caliper and adapted to be urged against opposite faces of the disc by actuator means.

In accordance with the invention the brake drag forces are taken from the brake pads at the leading edges thereof.

Thus the present invention provides a spot-type disc brake in which circumferentially outwardly facing abutment surfaces are provided on a caliper member and/or on some other member which is fixed and each brake pad assembly is provided with complementary, circumferentially inwardly facing surfaces for cooperation with the outward abutment surfaces for the purposes of taking the brake drag forces from the pad assemblies.

Preferably, for each pad assembly the abutment surfaces on the caliper or other member include an abutment surface disposed radially outwardly of the line of action of the brake drag force and an abutment surface disposed radially inwardly of this line of action.

The invention is advantageously applicable to a fixed caliper disc brake in which the caliper may have a closed top. Thus the actuating means can comprise opposed pistons slidable in bores in opposite limbs of the fixed caliper.

Figure 1:
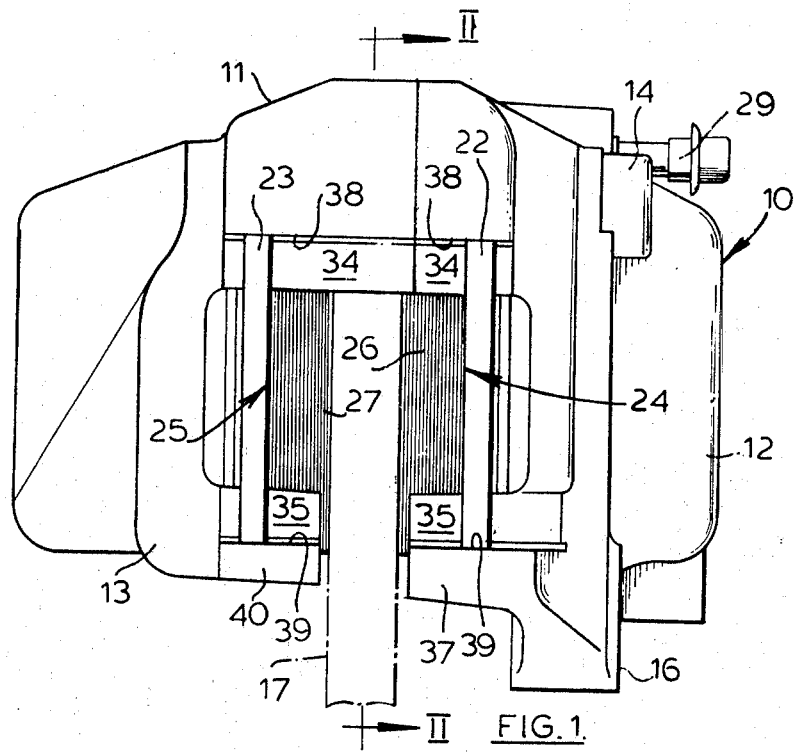
Figure 3:
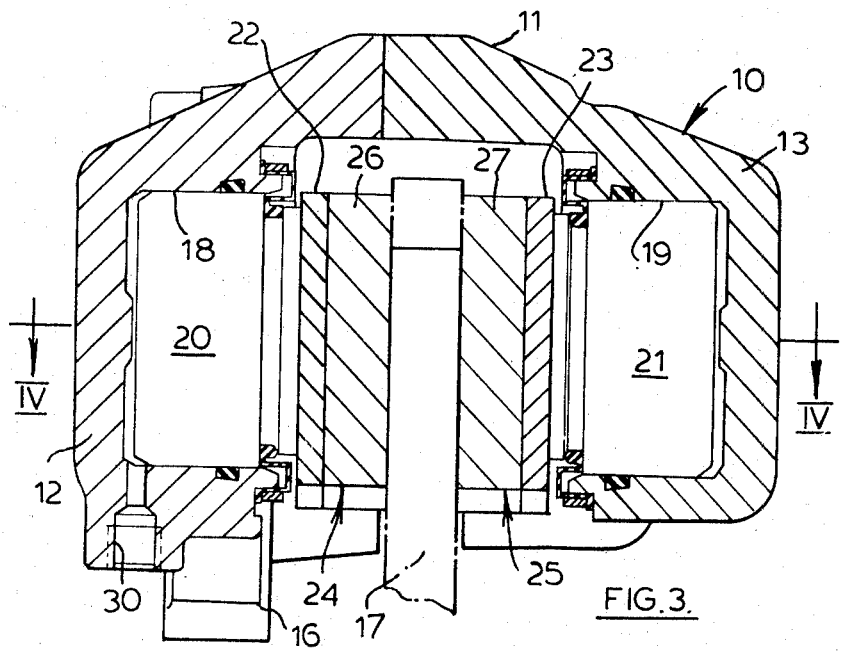
Figure 5:
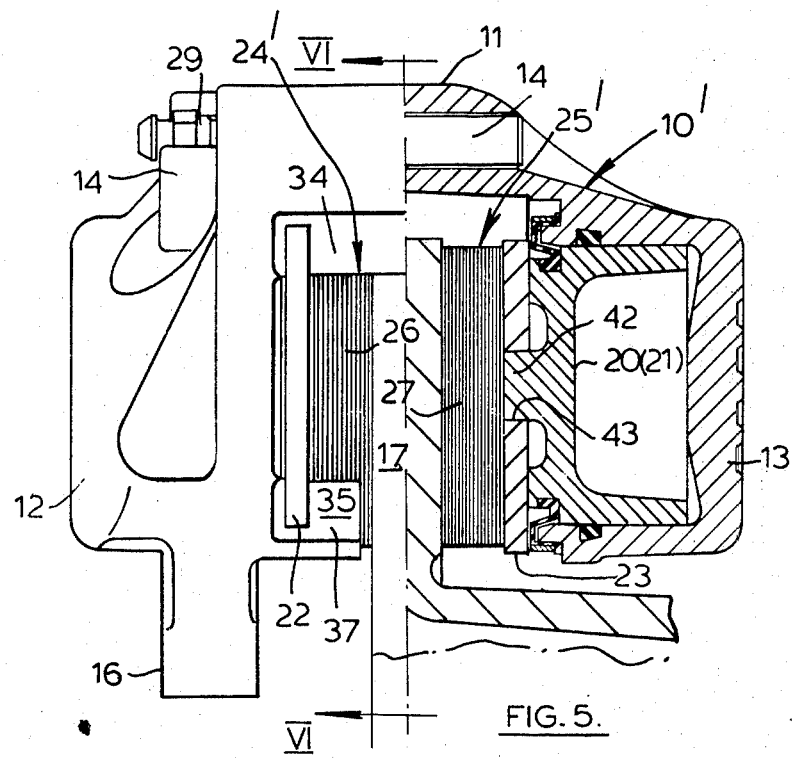
Figure 6:
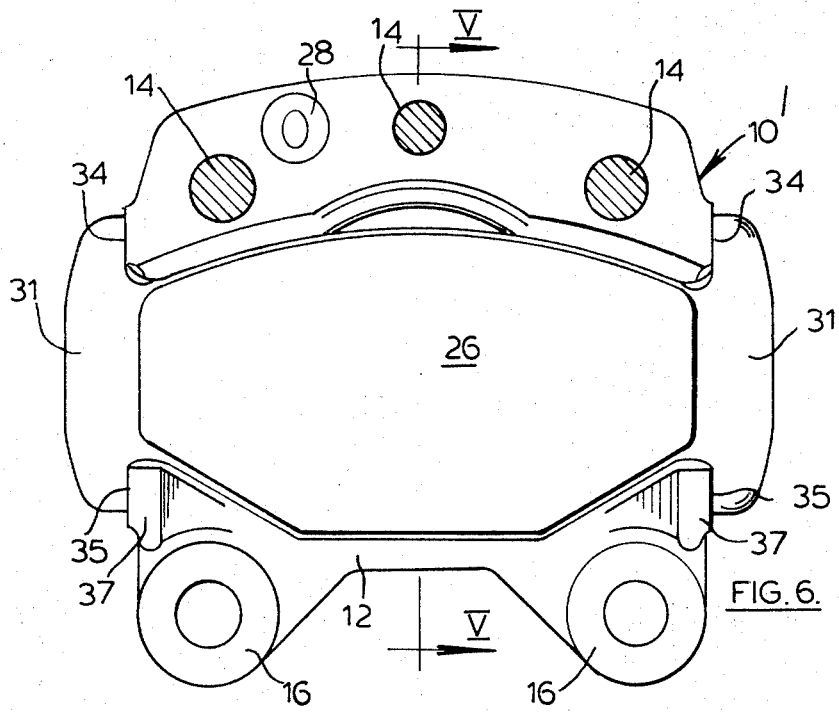

The invention is further described, by way of example, with reference to the accompanying drawings in which:

FIG. 1 is a side elevation viewed in the direction of the arrows I in FIG. 2 and 4 of a spot type disc brake constructed in accordance with one embodiment of the invention, FIG. 2 is a sectional elevation on the line II—II of FIG. 1, FIG. 3 is a sectional view on the line III—III of FIG. 2, FIG. 4 is a plan view partly sectioned on the line IV—IV of FIGS. 2 and 3, FIG. 5 is a side elevation, partly sectioned on the line V—V of FIG. 6, of a second embodiment of disc brake, and FIG. 6 is a view on the line VI—VI of FIG. 5.

Referring first to FIGS. 1 to 4, a spot-type disc brake has a fixed caliper 10 having a closed top or bridge part 11. The caliper 10 comprises two caliper members 12 and 13 secured to one another by bolts 14 passing through holes in the top part of the member 12 and screwed into screw-threaded bores 15 in the top part of the member 13. The caliper member 12 has mounting ears 16 which enable the caliper to be secured so that it straddles a disc 17.

Each caliper member 12, 13 contains a blind bore or cylinder 18, 19 in which slides a piston 20, 21 of hydraulic actuating means. Each piston 20, 21 bears against the back plate 22, 23 of a respective pad assembly 24, 25 and serves to press the friction pad 26, 27 against the respective face of the disc 17. The inner ends of the blind bores 18 and 19 are interconnected by a passage 28 which is formed through the bridge part 11 and to which a bleeder orifice 29 is connected. A brake fluid inlet 30 is connected to the base of the blind bore 18.

As can be seen in FIG. 2 particularly, the back plate 22 of the pad assembly 24 as "T" shaped side edge portions 31. Flat mutually facing surfaces 32 of the radially outward limbs of the "T" shaped side edge portions 31 bear on complementary, abutment surfaces 34 and 35 formed on the caliper 10 and facing away from one another. Likewise, flat mutually facing surfaces 33 of the radially inward limbs of the side edge portions bear on complementary abutment surfaces 35 formed on the caliper 10 and facing away from one another. More specifically the abutment surfaces 34 which are located radially outwardly of the line 36 of action of the brake drag force developed at the friction pad 26 are formed on the caliper member 12 on the bridge part thereof. The abutment surfaces 35 which also face away from one another are formed on lugs 37 which are integral with the caliper member 12. The surfaces 32 and 33 on the pad assembly 24 are perpendicular to the line 36 of action and the pad assembly 24 is radially located by flat locating surfaces 38 and 39 which are parallel to the line 36 of action and cooperate with the radially outward and inward ends of the "T" shaped edge portions 31, the outer surfaces 38 being disposed on the bridge part of the member 12 and the surfaces 39 being formed on the lugs 37.

Whilst FIG. 2 shows the pad assembly 24 it will be appreciated that the pad assembly 25 is of identical construction and cooperates with identical abutment and locating surfaces of which the radially inner surfaces 35 and 39 are formed on lugs 40 integral with the caliper member 13 and the radially outer surfaces 34 and 38 are formed on the bridge part of the caliper member 13.

If it is assumed now that the normal direction os rotation of the disc 17 is clockwise as seen in FIG. 2 and as indicated by the arrow 41, the brake drag forces developed at the friction pads 26 and 27 are transferred to the fixed caliper 10 at the left hand abutment surfaces 32 and 33 (FIG. 2). Since the abutment surfaces 32 and 33 are at opposite sides of the line 36 of action of the frictional forces no resultant couples are applied to the pad assemblies, 24 and 25 which would tend to turn these pad assemblies. In fact, the provision for the brake drag forces to be taken from the pad assembly at the leading edges thereof leads to greater stability of the pad assemblies since they are being pulled rather than pushed in contrast to known pad assemblies, wherein the brake drag forces are taken at the trailing edges. This feature may also lead to reduced tendency for brake squeal to take place. The provision of "T" shaped edge portions 31 on both edges of the pad assemblies enables the same brake to be used for disc rotation in either direction.

Other features are that manufacture is simplified since the abutment surfaces are exterior surfaces of the caliper and are therefore easier to machine and that it is possible to construct the brake with a greater pad area thereby resulting in longer pad life.

FIGS. 5 and 6 of the drawings show another embodiment which is in many respects similar to the embodiment of FIGS. 1 to 4 and like parts are denoted by like reference numerals. The principal difference is that the radial locating surfaces 38 and 39 on the caliper 10' are omitted and instead the pad assemblies 24' and 25' are radially located by central projections 42 formed on the pistons 20 and 21 and projecting into central apertures 43 formed in the pad back plates 22 and 23.

Whilst the drawings illustrate only one piston on each side of the disc it is possible to provide two pistons side by side at each side of the disc such that both pistons on either side act on a common pad assembly.

We claim:

1. A spot-type disc brake comprising a caliper adapted to straddle a disc rotatable about a rotary axis, a pair of opposed brake pad assemblies located in the caliper, each pad assembly having a back plate and a brake pad thereon, actuator means adapted to urge the brake pads of the pad assemblies against opposite faces of the disc, and means for sustaining brake drag forces from the leading side only of said pad assemblies considering the rotation of said disc, said last named means comprising first and second radially spaced pairs of circumferentially spaced abutment surfaces on each of said back plates, said pairs being on the radially outer and inner sides respectively of the line of action of the braking drag force acting on the respective pads when the latter are urged against a rotating disc, the abutment surfaces of each pair mutually facing inwardly, a non-rotatable drag force sustaining member having first and second parts spaced apart axially with respect to the rotating axis of the disc, first and second separate pairs of circumferentially spaced abutment surfaces disposed on each of the parts of the drag force sustaining member on the radially outer and inner sides respectively of said line of action, the abutment surfaces of each pair mutually facing outwardly and being complementary to and cooperating with the respective first and second pairs of abutment surfaces on the respective back plates, said cooperating abutments sustaining the braking forces at the leading side of said pad assembly on both sides of the line of action of the braking forces throughout the life of the pads.

2. A disc brake according to claim 1 in which said abutment surfaces are flat and are perpendicular to said line of action.

3. A disc brake according to claim 1 in which the drag force sustaining member comprises portions of said caliper.

4. A disc brake according to claim 3 in which said caliper comprises a fixed caliper.

5. A disc brake according to claim 4 in which said actuator means comprise cylinders in opposite limbs of said caliper and pistons slidable in said cylinders.

6. A disc brake according to claim 5 in which said pad assemblies have recesses therein and said pistons have projections thereon extending into said recesses to radially locate said pad assemblies.

7. The spot-type disc brake of claim 1 wherein each back plate has side edge portions disposed circumferentially of its brake pad, said first and second pairs of abutment surfaces extending radially outwardly and inwardly respectively from said side edge portions.

8. The disc brake of claim 7 in which said side edge portions are T-shaped, said abutment surfaces being defined by the inner faces of the limbs of the T-shaped parts of said side edge portions.

9. A disc brake according to claim 8 in which the abutment surfaces on said non-rotatable drag sustaining member include radially inwardly and outwardly facing locating surfaces constructed and arranged to cooperate with the extremities of said limbs of said T-shaped side edge portions to radially locate said pad assemblies.

10. A disc brake according to claim 9 in which the radially inwardly and outwardly facing surfaces on the extremities of said limbs are parallel to said line of action and cooperate with said locating surfaces.

* * * * *